United States Patent [19]

Hung

[11] Patent Number: 4,789,310
[45] Date of Patent: Dec. 6, 1988

[54] MULTI-FUNCTION IMPLEMENT FOR ILLUMINATION AND AIR-SUPPLY

[76] Inventor: Michael Hung, 11th Fl., 624 Ming Chuan E. Rd., Taipei, Taiwan

[21] Appl. No.: 631

[22] Filed: Jan. 5, 1987

[51] Int. Cl.$^4$ .................................... F04B 23/10
[52] U.S. Cl. ............................ 417/234; 417/313; 417/319; 417/429; 15/339; 15/344; 362/184
[58] Field of Search ............ 417/234, 313, 319, 426, 417/429; 15/344, 339; 362/184, 236

[56] References Cited

U.S. PATENT DOCUMENTS

| | | | |
|---|---|---|---|
| 2,643,614 | 6/1953 | Rosenkrans | 417/319 |
| 2,861,174 | 11/1958 | Talbot et al. | 362/184 X |
| 2,980,889 | 4/1961 | Meissner | 362/184 X |
| 4,467,403 | 8/1984 | May | 362/184 X |
| 4,483,664 | 11/1984 | Armbruster | 417/313 X |
| 4,513,470 | 4/1985 | Toya | 15/344 X |
| 4,573,234 | 3/1986 | Kochte et al. | 15/344 X |
| 4,614,479 | 9/1986 | Liv | 417/234 X |
| 4,636,230 | 1/1987 | Fan | 15/339 X |
| 4,656,687 | 4/1987 | Wei | 15/339 X |

FOREIGN PATENT DOCUMENTS

| | | | |
|---|---|---|---|
| 1023673 | 9/1955 | Fed. Rep. of Germany | 417/234 |
| 1528446 | 8/1969 | Fed. Rep. of Germany | 417/319 |

*Primary Examiner*—Leonard E. Smith
*Assistant Examiner*—Eugene L. Szczecina, Jr.
*Attorney, Agent, or Firm*—Wenderoth, Lind and Ponack

[57] ABSTRACT

A multi-functional implement useful as a portable automobile accessory which includes a main casing and an air functional portion mounted in the main casing. The air functional portion includes a first mechanism for blowing air outwardly of the main casing and a second mechanism for pumping air under pressure outwardly of the main casing. A motor having an output shaft extending in a longitudinal direction is movably mounted in a frame which is mounted in the main casing such that the motor is movable back and forth in the longitudinal direction. A lever is pivotably mounted to the main casing and connected to the motor for moving the motor between a first position at which the motor is engageable with the first mechanism to effect blowing of air outwardly of the main casing and a second position at which the motor is engageable with the second mechanism to effect pumping of air under pressure outwardly of the main casing. The lever extends outwardly of the main casing to allow manual movement of the motor by means of the lever between the first and second positions. A light functional portion including a light casing pivotally connected to the main casing includes a bright light and a warning light which flashes intermittently. Flexible hoses are provided for pumping air or blowing air out of the main casing and a flexible hose is provided for sucking air into a dust collecting compartment.

14 Claims, 5 Drawing Sheets

MULTI-FUNCTION IMPLEMENT FOR ILLUMINATION AND AIR-SUPPLY

FIELD OF THE INVENTION

The invention relates to an implement having multiple functions in tire-inflating, dust-cleaning, air-fanning, illuminating and light-warning, particularly for a type that can be carried by cars and when necessary, to use the direct current power source of the car to perform one or more selected functions thereof.

BACKGROUND OF THE INVENTION

A car is a rather complicated vehicle which includes a lot of mechanical and electrical parts and breakdowns can occur during driving, especially when it is dark at night or during hazardous driving conditions.

To fix the car in the dark of night, it is necessary that the driver have available auxiliaries, such as a warning-light to avoid being hit by other cars or to ask for help from passing cars, a lamp for convenience in fixing the car, an air compressor for inflating the tires, etc.

SUMMARY OF THE INVENTION

The present invention seeks to provide an implement which combines the many possible auxiliaries such as those described above in one unit and which is foldable for being easily carried in cars.

One object of the present invention is to provide an implement comprising a direct current motor for driving an air pump or a fan inside the implement and thereby performing the functions of tire-inflating, dust-cleaning and air-blowing.

Another object of the present invention is to provide an implement comprising an electronic controlled circuit in the implement and thereby performing a function of illumination or light-warning.

A further object of the present invention is to construct an implement in a compact size which is of a foldable type for being easily carried in a car and which is convenient for the driver to use.

Other objects will be apparent from the following description taken in conjunction with the accompanying drawings.

DESCRIPTION OF THE PREFERRED EMBODIMENTS

Figure 1:
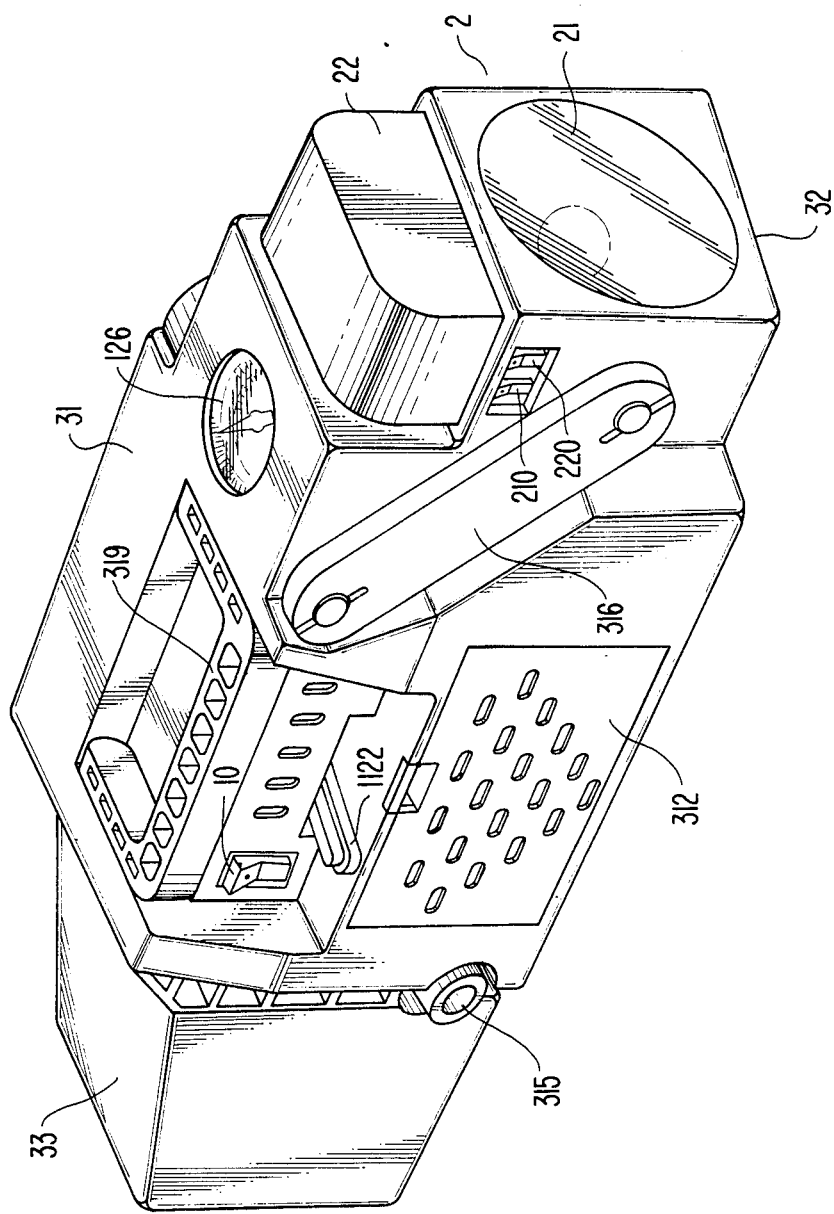
FIG. 1 is a perspective view of the invention.
Figure 2:
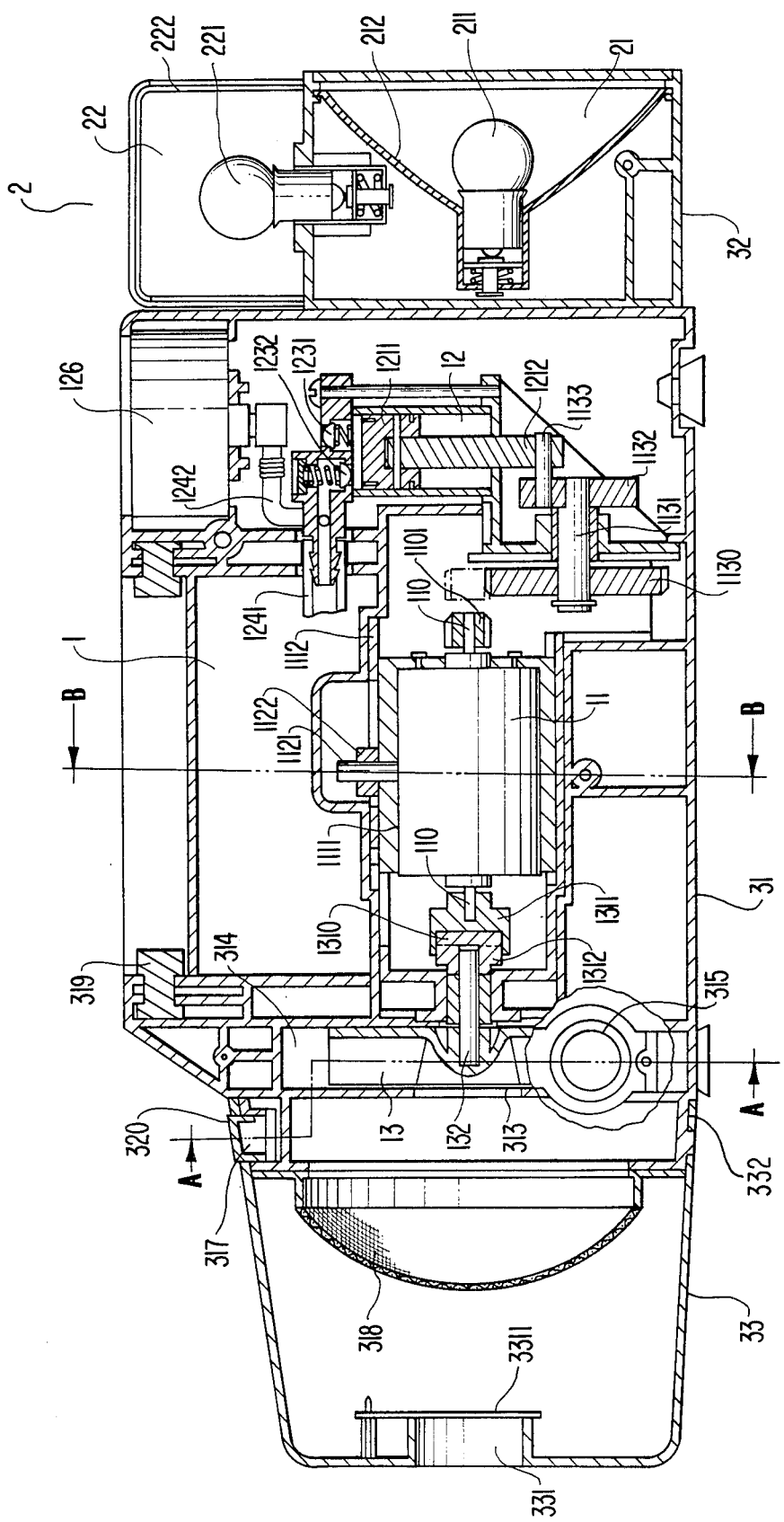
FIG. 2 is a longitudinal cross-sectional view of the invention shown in FIG. 1.
Figure 3:
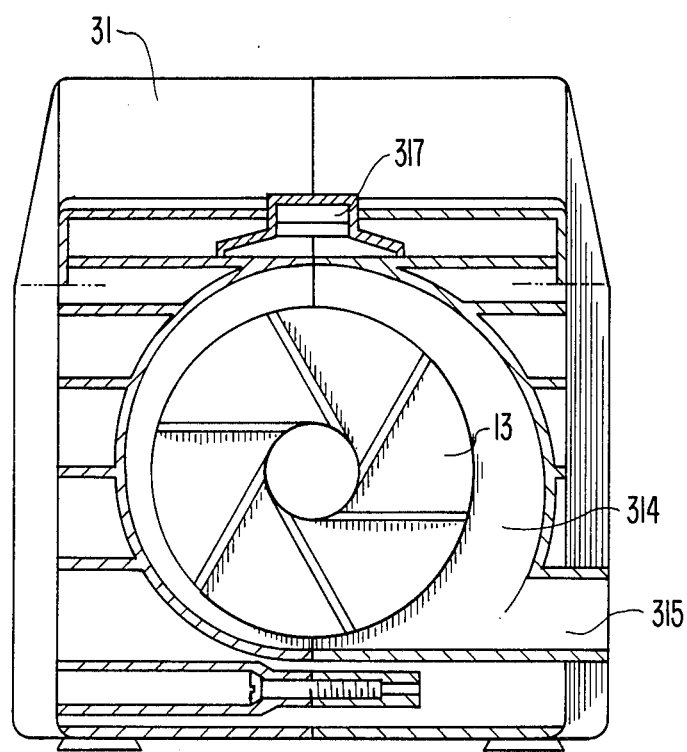
FIG. 3 is a transverse cross-sectional view along line A—A in FIG. 2.

Referring now to FIGS. 1 and 2, the present invention includes an air portion 1 and a light portion 2.

The air portion 1 includes a direct current motor 11 mounted firmly within a motor mount 1111, the mount 1111 carrying the motor 11 being slidably placed in a frame 1112 for movement in a longitudinal direction parallel to an axis of rotation of a motor shaft 110 of the motor 11. A driving gear 1101, as shown in FIG. 2, is provided at one end of the motor shaft 110, and is engageable with a driven gear 1130 to perform air pumping or the motor can be moved along the longitudinal direction to engage a (jagged) disc-clutch 1311, provided at another end of the motor shaft 110, with a propeller 13 to perform air fanning or blowing.

Figure 4:
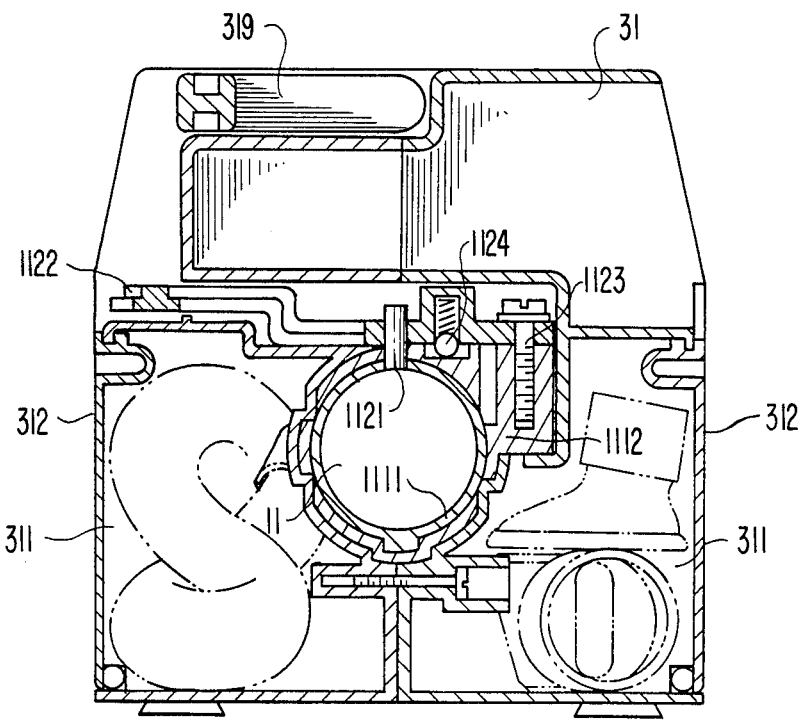
FIG. 4 is a transverse cross-sectional view along line B—B in FIG. 2.

As shown in FIGS. 2 and 4, the movement of the motor mount 1111 (together with the motor 11) is controlled by a movable lever 1122 which is pivotally secured at one end thereof to a surface of the frame 1112 and the other end thereof extends outward of an outer casing of the air portion for manual operation of the lever 1122. A post 1121 on the motor mount 1111 extends onto a recess in the frame 1112 and into a pivot connection on the lever 1122 formed by a hole in the pivotable lever 1122, whereby the motor mount 1111 carrying the motor 11 can be moved longitudinally to perform air pumping or air fanning upon manual movment of the pivotable lever 1122.

A steel ball 1124 is carried in a recess provided in the pivotable lever 1122 and a spring e.g., mounted in the recess urges the ball 1124 towards the frame 1122 so that the ball 1124 is movable along the surface of the frame upon movement of the lever 1122. At both ends of the ball-travelling path, which correspond to the motor 11 being in the air-pumping position or in the air-fanning position, a recess is provided in the surface of the frame 1112 serving to position the ball 1124, and thus the motor 11 is held in the desired position.

Referring back now to FIG. 2, when the motor 11 is placed at the aforesaid air-pumping position, the driving gear 1101 engages with the driven gear 1130 to turn a transmission rod 1131 connected to a crank wheel 1132. The crank wheel 1132 carries a connecting rod 1133 mounted eccentrically thereon and connected to a piston rod 1212 to thereby reciprocate a piston 1211 carried by the piston rod 1212 in a pump 12 so as to pump air to an inflating valve 125.

Figure 7:
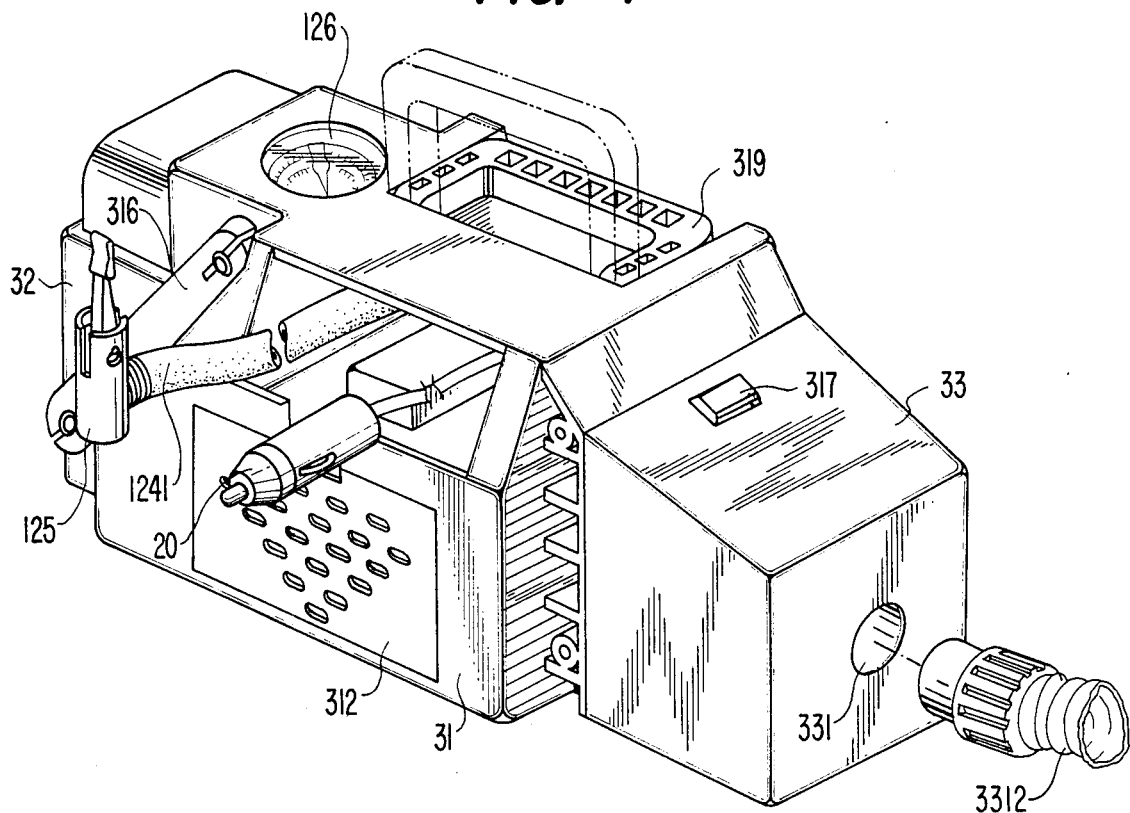
FIG. 7 is a perspective view of the invention schematically showing the individual apparatuses for air-inflating and dust-cleaning.

The air pump 12 has two valves on the top thereof, one being an intake valve 1231 which is a one-way valve for induction of air into the pump 12 and, the other being an exhaust valve 1232 which is another one-way valve for induction of the compressed air through a hose 1241 to the inflating valve 125 (FIG. 7) or through a branch hose 1242 to an air pressure meter 126.

When the inflating valve 125 is connected to a tire of a car, the compressed air will then inflate the tire, but when the operation of the pump 12 is stopped, the meter 126 will show the pressure of the air in the tire.

Figure 8:
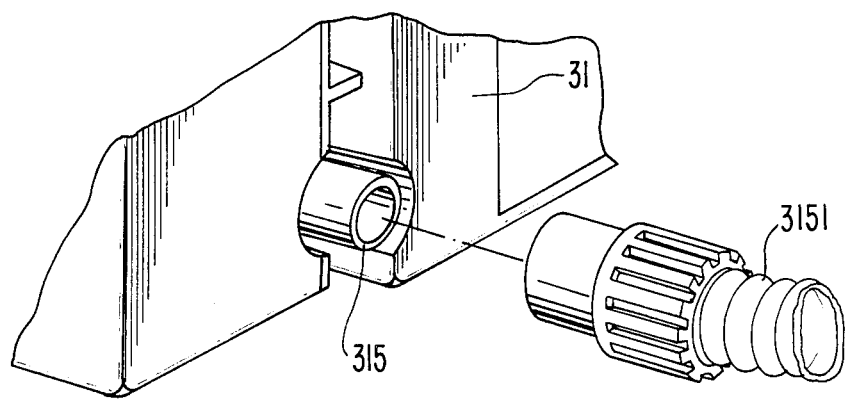
FIG. 8 is a fragmentary perspective view of the invention showing the apparatus for air-fanning.

On the other hand, when the motor 11 is moved and placed at the aforesaid air-fanning position, the jagged disc clutch 1311 provided on the other end of the motor shaft 110 coaxially fits on a jagged disc-like head 1312, which has a jagged portion closely and properly engaging with a jagged portion 1310 of the clutch 1311, so as to turn the head 1312. Another transmission rod 132 is connected between the head 1312 and the intake propeller 13 in a chamber 314. Air will then be inducted into the chamber 314 by rotation of the propeller 13 and expelled to an outlet 315 and through a flexible hose 3151, FIG. 8.

A fan casing 33 forms a chamber on the front of the propeller 13 which has an inlet 331 at the foremost end thereof and has a sieve filter 318 fitted therein before another end opening portion 332, the portion 332 being removably fitted onto a foremost opening of a main casing 31 where locking parts 320 are provided thereon to lock the casing 33 onto the main casing 31. Inward of the inlet 331 of the casing 33 there is provided a one-way valve plate 3311 which covers the inlet 331 serving to prevent air (or dust) escaping therefrom. A flexible hose 3312, FIG. 7, can be fitted into the inlet 331 for use as a vacuum or sucking hose.

Upon operation of the propeller during air-fanning, air together with dust will be sucked through the flexible hose 3312 into the chamber formed by the casing 33, the sieve filter 318 serving to retain dust in the chamber but allowing air to pass into the propeller chamber 314 through an opening 313 and be expelled out from the opening 315 through the hose 3151. The casing 33 acts as a dust collecting chamber when using the flexible hose 3312 to suck dust, and the hose 3151 can be used for drying or other purposes when blown clean air is needed.

Figure 6:
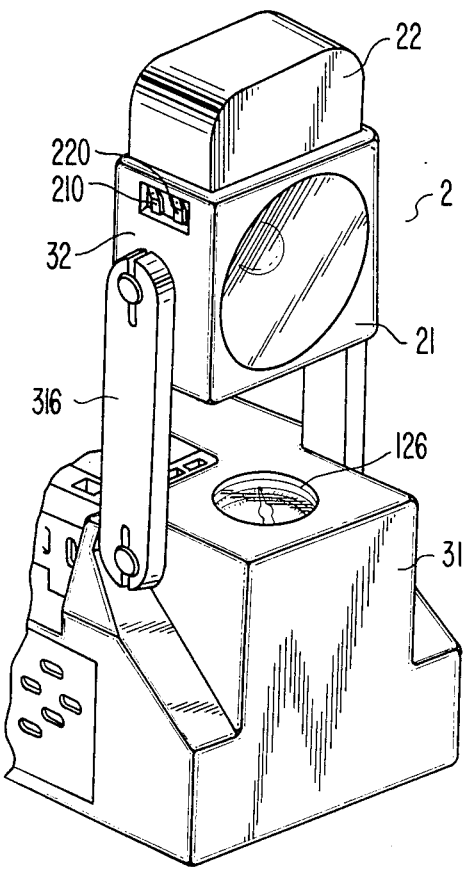
FIG. 6 is a fragmentary perspective view of the invention schematically showing the lamp portion in a lifted position.

As shown in FIGS. 1, 2 and 6, the light portion 2 of the present invention includes an illumination part 21 and a warning-light part 22, both of which are combined in a light casing 32, preferably with the latter above the former. The illumination part 21 includes a parabolic reflector 212, a reflector lamp 211 and a switch 210. The warning light part 22 includes a controlled circuit of a flasher to supply an intermittent d.c. current to a lamp 221 and another switch 220 for controlling the supply of d.c. power source, and a transparent panel 222 on the front side of the light part 22 to emit a flashing light. The light portion 2 has an input cord and plug 20 for connection to an electrical socket connected to the battery of a car. The input cord is respectively connected to the switch 210 of the illumination part 21 and a switch 220 of the light-warning part 22 so as to perform both or either function(s) of the present invention upon selective operation of the switches 210, 220.

The illumination part 21 will supply a beam of bright light for a driver in the darkness at night when the car experiences trouble, and the light-warning part 22 will flash an intermittent light signal in the darkness at night to warn oncoming cars and ask for help.

Moreover, the present invention further comprises a manner of construction which enables the present implement to be of a foldable type which has a compact size for storage in a car.

The main casing 31 containing the air portion 1 therein is provided with a switch 10 thereon for operation of the motor 11 and the lever 1122 extends outwardly therefrom for selective operation of motor 11 to run the propeller 13 or the pump 12 as described above. Also, two side storage spaces 311 defined by two removable side panels 312, as clearly seen in FIG. 4, can receive the flexible hoses 3312, 3151 and 1241 so as to completely contain these auxiliary instruments inside the main casing 31 when they are not being used.

The fan casing 33 serves as a dust collecting chamber and air filter, and can be fitted on one end of the main casing 31 facing the propeller 13 as described above.

Figure 5:
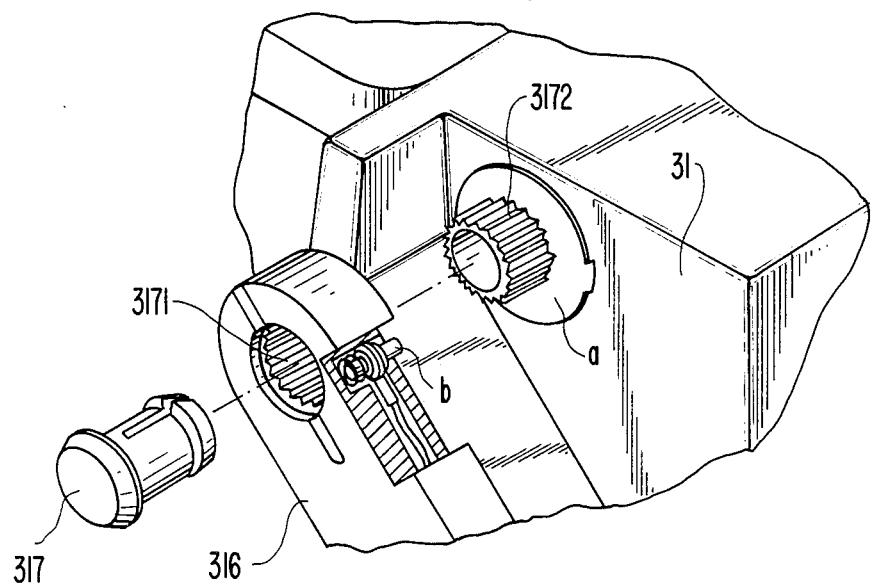
FIG. 5 is a fragmentary perspective view of the invention schematically showing a rack arm and its conjunction mechanism parts.

The light casing 32 containing the light portion 2 therein, includes two side levers 316 symmetrically pivotally connected to the main casing 31 in such a manner that, as clearly shown in FIGS. 5 and 6, both ends of each of the levers 316 are each provided with an inner-geared hole 3171 which is suitably fitted on an outer-geared hole 3172 formed respectively on appropriate positions on the sides of the casings 31 and 33, each of the levers 316 being held on the posts 3172 by means of a rivet-like post-pin 317 fitted in each post 3172 to ensure the connection of the levers 316 thereto.

Both casing 31 and 33 are preferably made of elastic material, such as plastic, and the geared portions of holes 3171 and hollow-posts 3172 are small enough to allow easy turning of the levers 316 on the hollow-posts 3172 yet maintain the levers 316 in any desired lifted level with the light portion 2 at any desired angle relative to the main casing 31.

When the inventive light implements are not being used, one simply turns down the levers 316 and places the light portion 2 on the front side of the main casing 31, whereby the apparatus of the present invention is then substantially in a well defined configuration which is convenient for being carried.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

I claim:

1. A multi-function implement useful as a portable automobile accessory, comprising:

a main casing;

an air functional portion mounted in said main casing, said air functional portion including a first means for blowing air outwardly of said main casing and a second means for pumping air under pressure outwardly of said main casing;

a motor having an output shaft extending in a longitudinal direction, said motor being mounted in a frame mounted in said main casing, said motor being movable back and forth in said longitudinal direction;

a lever pivotably mounted to said main casing and connected to said motor for moving said motor between a first position at which said motor is engageable with said first means to effect blowing of air outwardly of said main casing and a second position at which said motor is engageable with said second means to effect pumping of air under pressure outwardly of said main casing, said lever extending outwardly of said main casing to allow manual movement of said motor by means of said lever between said first and second positions; and a light functional portion including an illuminating part and a warning-light part disposed in a light casing connected to said main casing, said light casing being connected to said main casing by two levers, each end of each of said two levers being respectively pivotally connected to said light casing and said main casing.

2. The implement of claim 1, wherein said output shaft of said motor includes a disc clutch, said first means including a propeller and a head mounted on a transmission rod for rotation therewith, said head being engageable with said disc clutch when said motor is in said first position to thereby effect blowing of air outwardly of said main casing.

3. The implement of claim 2, wherein said first means further includes an air blowing outlet in said main casing, said outlet being connected to a propeller chamber in which said propeller is disposed whereby air can be blown outwardly of said main casing through said outlet.

4. The implement of claim 3, further including a flexible hose having an end thereof attachable to said outlet.

5. The implement of claim 1, wherein said output shaft of said motor includes a drive gear thereon, said second means including an air pump and means for driving a piston of said air pump, said piston driving means including a driven gear engageable with said drive gear when said motor is in said second position to thereby effect pumping of air under pressure outwardly of said main casing.

6. The implement of claim 5, wherein said second means further includes an exhaust valve connected to said pump and a hose having an inflating valve connected to said exhaust valve for pumping air under pressure into a tire.

7. The implement of claim 6, wherein said second means further includes a branch hose connected to said hose and an air pressure meter whereby air pressure in a tire can be determined by reading said air pressure meter when said inflating valve is connected to a valve of a tire.

8. The implement of claim 3, further including a fan casing defining a dust collecting chamber extending from said main casing, said fan casing having an inlet therein for passage of air therethrough due to operation of said first means, said fan casing further including a filter covering an opening in said main casing to said propeller chamber whereby dust is prevented from entering said propeller chamber and clean air can be blown outwardly from said main casing.

9. The implement of claim 8, further including a flexible hose having an end thereof attachable to said inlet in said fan casing.

10. The implement of claim 1, further including a light functional portion including an illuminating part and a warning-light part disposed in a light casing connected to said main casing.

11. The implement of claim 1, further including switch means for independent and simultaneous operation of said illuminating part and said warning-light part, said light functioning portion further including means for connecting said switch means to an electric power supply.

12. The implement of claim 10, wherein said light casing is connected to said main casing by at least one lever, each end of said at least one lever being respectively pivotally connected to said light casing and said main casing.

13. The implement of claim 1, wherein said two levers are connected to said light casing and said main casing by means for maintaining said two levers in any desired angular position with respect to said light casing and said main casing while allowing easy manual movement of said two levers to any one of said angular positions whereby said light casing can be tilted to any desired position.

14. The implement of claim 8, further including locking means for removably securing said fan casing and said main casing together.

* * * * *